(12) United States Patent
Fox et al.

(10) Patent No.: US 8,111,564 B2
(45) Date of Patent: *Feb. 7, 2012

(54) SETTING CONTROLLER TERMINATION IN A MEMORY CONTROLLER AND MEMORY DEVICE INTERFACE IN A COMMUNICATION BUS

(75) Inventors: Benjamin A Fox, Rochester, MN (US); William P Hovis, Rochester, MN (US); Thomas W Liang, Rochester, MN (US); Paul Rudrud, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/361,836

(22) Filed: Jan. 29, 2009

(65) Prior Publication Data

US 2010/0192000 A1 Jul. 29, 2010

(51) Int. Cl.
*G11C 7/00* (2006.01)

(52) U.S. Cl. ......... 365/189.18; 365/189.17; 365/233.13; 365/149

(58) Field of Classification Search .................. 365/198, 365/230.06, 196, 189.18, 189.17, 233.13, 365/149
See application file for complete search history.

(56) References Cited

U.S. PATENT DOCUMENTS

| | | | |
|---|---|---|---|
| 6,049,221 A | 4/2000 | Ishibashi et al. | |
| 6,130,836 A | 10/2000 | Matsubara et al. | |
| 6,330,194 B1 | 12/2001 | Thomann et al. | |
| 6,414,525 B2 | 7/2002 | Urakawa | |
| 6,639,423 B2 | 10/2003 | Martin et al. | |
| 6,762,614 B2 | 7/2004 | Rearick et al. | |
| 6,807,650 B2 | 10/2004 | Lamb et al. | |
| 6,958,942 B2 | 10/2005 | Chang | |
| 7,362,622 B2 | 4/2008 | Braun et al. | |
| 7,411,407 B2 | 8/2008 | Rearick et al. | |
| 7,439,761 B2 | 10/2008 | Mayer et al. | |
| 7,489,160 B2 | 2/2009 | Kimura | |
| 7,514,954 B2 | 4/2009 | Kim et al. | |
| 7,515,487 B2 * | 4/2009 | Seo et al. | 365/189.09 |
| 7,593,272 B2 | 9/2009 | Doyle et al. | |
| 7,710,144 B2 | 5/2010 | Dreps et al. | |
| 7,848,175 B2 | 12/2010 | Fox et al. | |
| 2002/0149972 A1 | 10/2002 | Lamb et al. | |
| 2008/0272800 A1 * | 11/2008 | Haig et al. | 326/30 |
| 2010/0188908 A1 | 7/2010 | Fox et al. | |
| 2010/0188917 A1 | 7/2010 | Fox et al. | |
| 2010/0188919 A1 | 7/2010 | Fox et al. | |
| 2010/0192000 A1 | 7/2010 | Fox et al. | |

OTHER PUBLICATIONS

JEDEC Standard; POD18—1.8 V Pseudo Open Drain I/O; JESD8-19 Datasheet [online]. JEDEC Solid State Technology Association, 2006 [retrieved on Mar. 12, 2008]. Retrieved from the Internet: <URL: http://www.jedec.org/download/search/JESD8-19.pdfl>.
Notice of Allowance issued for U.S. Appl. No. 12/361,592, mail date Feb. 25, 2011, 14 pp.

(Continued)

*Primary Examiner* — Vu Le
*Assistant Examiner* — Han Yang
(74) *Attorney, Agent, or Firm* — Toler Law Group

(57) ABSTRACT

A DRAM and memory controller are coupled during driver training to reduce mismatches. The impedances of the system are controlled through a termination at the controller to yield improvements in timing margins. The coupling of the components on a shared electrical bus through adjustment of the termination values during training removes known offset issues.

20 Claims, 6 Drawing Sheets

OTHER PUBLICATIONS

Notice of Allowance issued for U.S. Appl. No. 12/361,602, mail date Mar. 3, 2011, 14 pp.

JEDEC Standard; POD18—1.8 V Pseudo Open Drain I/O; JESD8-19 Datasheet [online]. JEDEC Solid State Technology Association, Dec. 2006 [retrieved Mar. 12, 2008]. Retrieved from the Internet at <www.jedec.org/download/search/JESD8-19.pdf> (14 pgs).

Notice of Allowance issued for U.S. Appl. No. 12/361,976, mail date Jul. 30, 2010, 7 pp.

Non-Final Office Action for U.S. Appl. No. 12/361,577, mailed Oct. 13, 2010, 10 pp.

Notice of Allowance mailed Sep. 19, 2011, U.S. Appl. No. 12/361,719, 9 pp.

* cited by examiner

SETTING CONTROLLER TERMINATION IN A MEMORY CONTROLLER AND MEMORY DEVICE INTERFACE IN A COMMUNICATION BUS

RELATED APPLICATIONS

The present application relates to co-pending U.S. patent applications, entitled "Setting Controller VREF in a Memory Controller and Memory Device Interface in a Communication Bus" (U.S. Ser. No. 12/361,719), "Calibration of Memory Drive with Offset in a Memory Controller and Memory Device Interface in a Communication Bus" (U.S. Pat. No. 7,848,175), "Setting Memory Controller Driver to Memory Device Termination Value in a Communication Bus" (U.S. Pat. No. 7,990,768), "Setting Memory Device Vref in a Memory Controller and memory Device Interface in a Communication Bus" (U.S. Pat. No. 7,974,141), and "Setting Memory Device Termination in a Memory Device and Memory Controller Interface in a Communications Bus" (U.S. Pat. No. 7,978,538), by the present inventors, Paul W. Rudrud, Thomas W. Liang, Benjamin A. Fox, and William P. Hovis. The co-pending applications are filed concurrently herewith, and are incorporated by reference in their entireties.

FIELD OF THE INVENTION

This invention relates to a device and method in which a memory device such as a DRAM and a memory controller are coupled during memory driver training to reduce mismatches by adjusting the termination impedance at a termination device of the memory controller. The invention further relates to conducting such adjustments to yield improvements in timing margins to remove known offset issues.

BACKGROUND OF THE INVENTION

In an electrical communication bus in which a memory controller is coupled with a memory device such as a GDDR3 DRAM memory, the DRAMs are designed to train their drive impedance and termination values against a reference resistor. However, process variations and resolution can cause variations in the final DRAM training values. The variations may occur within a memory controller coupled to the DRAM if it trains in a similar manner, thereby causing a mismatch in DRAM and controller impedances.

The mismatch may cause timing offsets due to reference voltages not being properly aligned to the resulting data eye. The problem occurs specifically in a GDDR3 interface from a memory controller to a GDDR3 memory device. However, the problem also occurs in a number of other system and sub-system electrical communication buses, resulting in reduced timing margins in other situations. For the above reasons, what is needed is an arrangement that couples a memory device and its memory controller during memory driver training. This arrangement may reduce mismatches by coupling the components on a shared electrical bus through impedance adjustment of a termination in a memory controller during training of the memory device. This may reduce or eliminate known offset issues.

SUMMARY OF THE INVENTION

Embodiments of the present invention provide a method and system in which a memory device and memory controller are coupled during driver training to reduce mismatches. Mismatches are reduced by controlling impedance within the system environment to yield improvements in timing margins. The components are coupled on a shared electrical bus and the driver is adjusted during training as necessary to remove known offsets.

While embodiments of the invention are specifically described in the context of the GDDR3 interface from a memory controller to a GDDR3 memory device, the device and methods can be applied to a number of systems or sub-system electrical communication buses. One aspect of the invention provides that such a method and device can be implemented where termination already exists.

Another aspect of the invention provides a method of setting a memory controller's termination impedance in an electrical communication bus having a memory controller connected to a memory device. A memory device is connected in the electrical communication bus with the corresponding memory controller during training of the drive impedance of a memory driver from the memory device. A first voltage is initialized on the communication bus as a bit level "0" to be read by the memory controller. A first voltage is set on a first test path of the memory controller corresponding to the first voltage on the electrical communication bus. The first voltage on the first test path is adjusted and monitored, and when the voltage on the first test path just switches its value, the impedance of the first termination device is set based on the switched first voltage.

Embodiments may include adjusting the first voltage until it switches to a level of 0.4 VDD on the first test path, and setting the termination impedance at the termination device based on the voltage level of 0.4 VDD.

Another aspect involves initializing a second voltage on the communication bus as a bit level "1" to be read by the memory controller. A second voltage corresponding to the bit level "1" is set on the electrical communication bus to be read by the memory controller. The second voltage is also set on a second test path of the memory controller, changed and monitored so that when the voltage on the second test path switches its value, the impedance at the second termination device is set based on the switched second voltage.

According to another aspect of the invention, there is provided a coupled memory controller and memory device in an electrical communication bus. A connection is provided between the memory interface of the memory controller to the memory device as a data net. The memory controller is programmed to read a first voltage level initialized as a first bit level voltage (i.e., a "0" level) on the connection from the memory device. A first test path is connected to the connection between the memory controller and memory device to have the first test voltage level applied thereto. The first test path is programmed for adjusting the first voltage level and is connected to a first termination device of the memory controller. A first detector serves to detect a first predetermined switched voltage on the first test path, and a first impedance module serves to set the impedance of the first termination device based on the first predetermined voltage.

Another aspect of the invention provides that the memory controller is also programmed to read a second voltage level initialized as a second bit level voltage (i.e., a "1" level) on the connection from the memory device. A second test path is connected to the connection between the memory controller and the memory device to have the second voltage level applied thereto. The second test path is programmed for adjusting the second voltage level. A second detector serves to detect a second predetermined switched voltage on the second test path. A second impedance module serves to set the impedance of the second termination device based on a second predetermined switched voltage.

These and other advantages and features that characterize the invention are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION OF THE INVENTION

Embodiments consistent with the invention may capitalize on the ability to couple a memory device such as a DRAM and a memory controller during driver training to reduce mismatches by adjusting the impedance at a termination device of the memory controller to yield improvements in timing margins. In more general terms, coupling the components on a shared electrical bus through level adjustment dramatically removes known offset issues. While embodiments of the invention are described specifically for a GDDR3 interface from a memory controller to a GDDR3 memory device, the system and method may be applied to any number of system and sub-system electrical communication buses.

Figure 1:
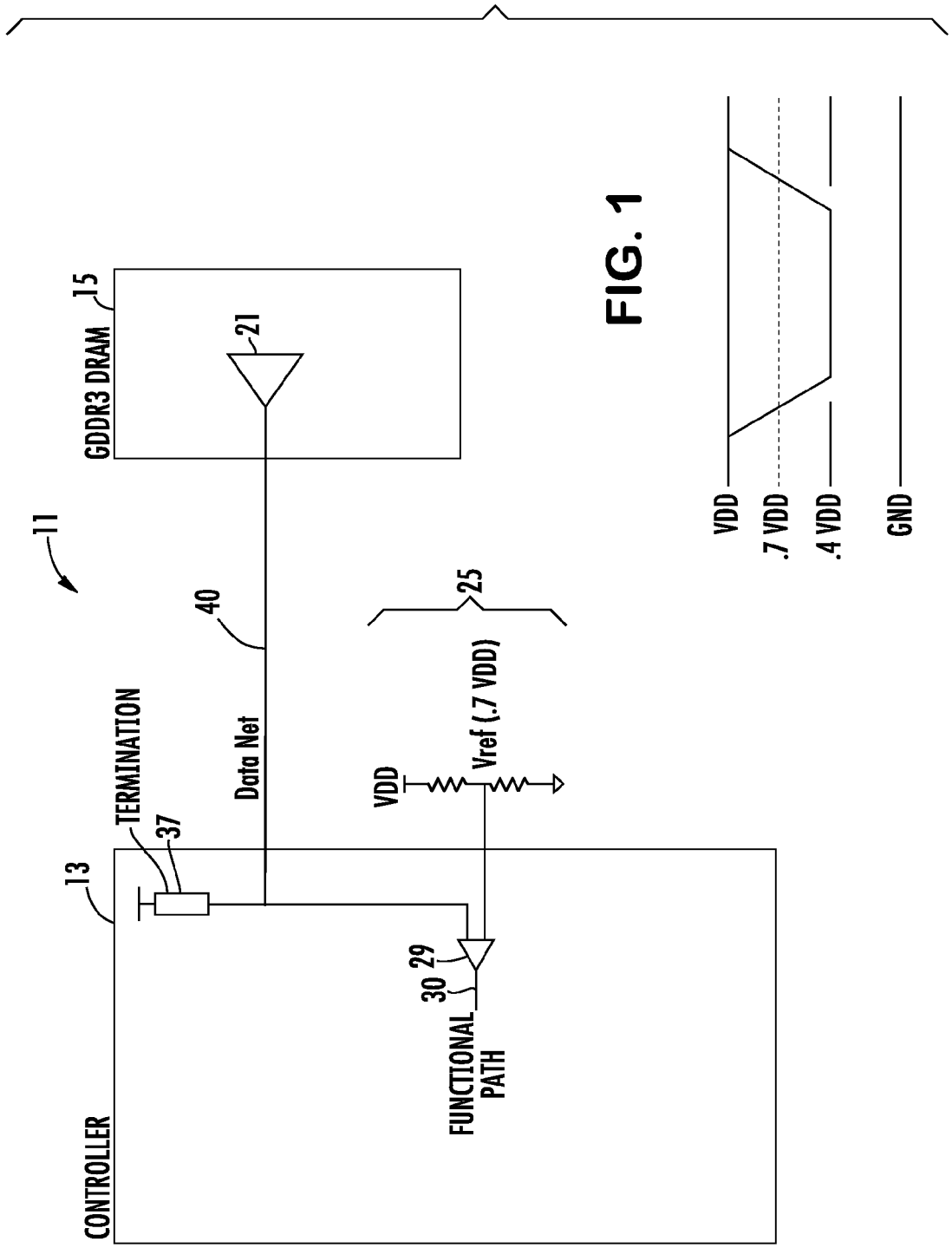
FIG. 1 is schematic diagram illustrating a typical prior art interface in an electrical communication bus between a memory controller and a memory device, such as a GDDR3 DRAM.

Turning more particularly to the drawings, FIG. 1 shows a typical GDDR3 interface system 11. More particularly, a memory controller 13 is connected through a data net 40 to a GDDR3 DRAM 15. The data net 40, i.e., a bus connection, connects to a functional path 30 including a comparator 29 in the memory controller 13. The functional path 30 is also connected to the data net 40, and a termination device 37. A reference voltage for the controller 13 is typically provided through a voltage divider pair of resistors 25.

In an arrangement such as is shown in FIG. 1, it is important to deal with variations in impedances between the devices in order to improve timing margins between the memory controller 13 and memory device 15 as operated on the net 40. More particularly, impedances at the termination device 37 of the controller 13 may be modified so that the vertical center of the read eye to the controller can be used to obtain maximum timing margins.

Figure 2:
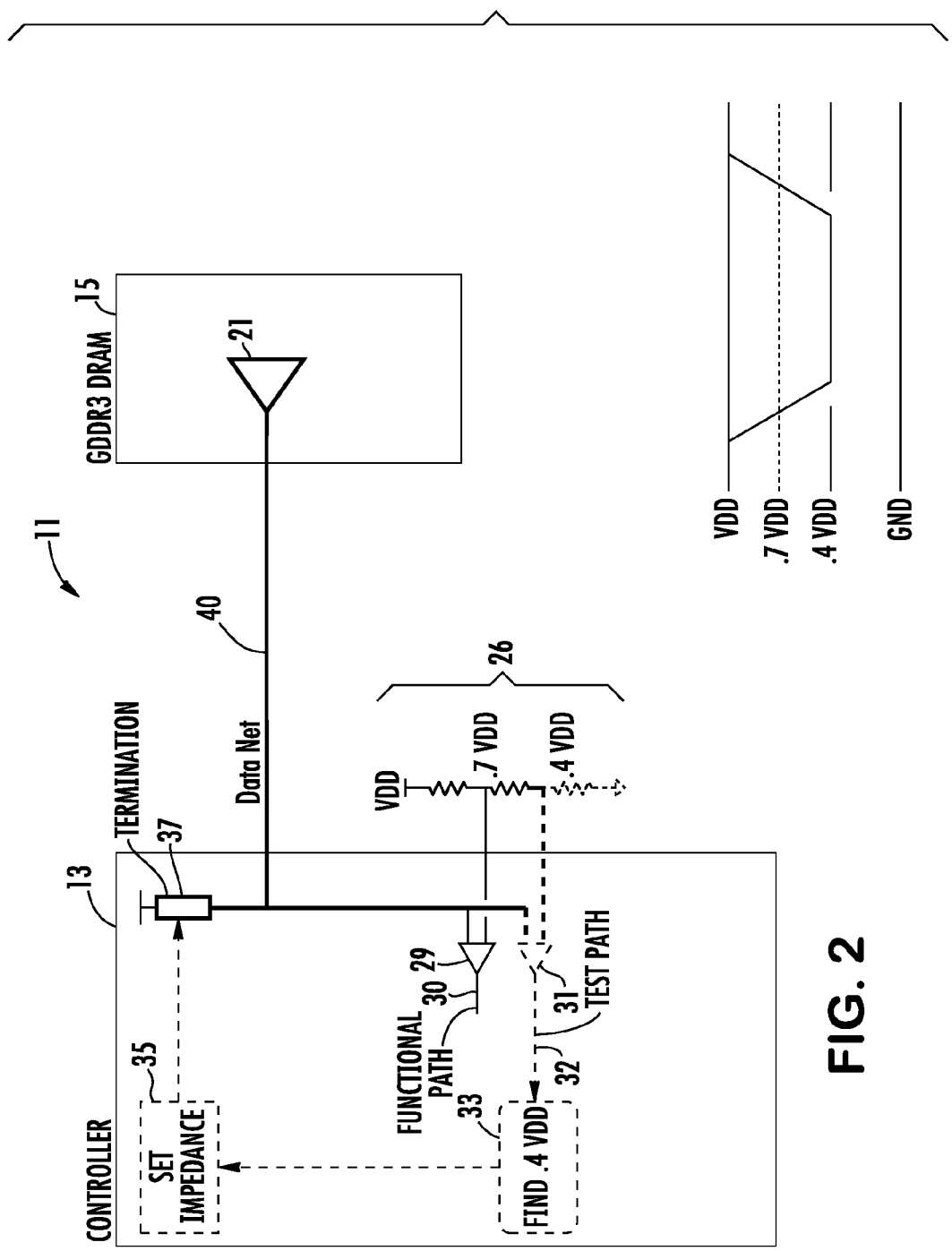
FIG. 2 is a schematic diagram of one embodiment of the invention for coupling a memory device and memory controller during memory device driver training to reduce mismatches.

Another embodiment of the invention is depicted generally by the system 11, as illustrated in FIG. 2. GDDR3 DRAM 15 includes a driver 21. The GDDR3 DRAM 15 may drive a "0" level value (reading a "0"), i.e., the DRAM 15 driver 21 is initialized by setting a "0" bit. The impedances of both the DRAM driver 21 and controller 13 termination 37 determines what the voltage of the "0" level will be on a data net 40. Embodiments address variations in impedances in order to obtain the greatest timing margin on the data interface through the data net 40.

In the exemplary embodiment, an initial voltage is set on the data net 40 by the GDDR3 DRAM 15 and is initialized as a "0" level voltage. The controller 13 reads the "0" level voltage on the data net 40, which is applied to the termination device 37 through a connection to a functional path 30 having a comparator 29. A Ladder of 3 resistors 26 is used to generate 2 voltages the first of which defines a predetermined reference voltage (labeled 0.7 VDD) and the second voltage which defines a predetermined voltage of the read "0" (labeled as 0.4 VDD). The functional path 30 has applied thereto the first voltage of the ladder of 3 resistors 26 in a conventional manner similar to that described in connection with FIG. 1. In addition, a second voltage of the ladder of resistors is applied to a test path 32 having a comparator 31 and including a voltage detector 33, and an impedance module 35 which sets the impedance at the termination device 37.

In the embodiment of FIG. 2, a voltage on test path 32 is detected by detector 33. For example, the initialized 0 bit level voltage from the data net 40 is detected. The voltage on the test path 32 indicates whether data net 40 is at a voltage higher or lower than 0.4 VDD. This voltage is detected by detector 33. The impedance of termination device 37 is set based on the predetermined voltage of "0" level and that voltage is set as the "0" level voltage on the data net 40.

In accordance with the embodiment of FIG. 2, when the GDDR3 DRAM 15 driver drives a "0," the impedances of both the driver 21 and termination 37 determine what the voltage "0" will be on the data net 40. To obtain the optimal timing margin on the data interface 40, it is important to deal with any variations in the driver and termination impedances. Thus, by modifying the termination impedance of controller 13, the vertical center of the read eye to the controller 13 can be used to obtain the maximum timing margin. Accordingly, the invention does not require modification to the GDDR3 DRAM 15.

By changing the termination impedance at the controller 13, the "0" value seen at the controller 13 is changed. The ladder of 3 resistors 26 provides two critical voltages to the controller: a predetermined reference voltage and a predetermined voltage of a "0" level. This is compared to FIG. 1 in which the pair of resistors provides only the predetermined reference voltage. Based on the predetermined voltage of "0" level, the controller 13 termination impedance can be adjusted until the "0" level voltage of the data net 40 reaches the predetermined voltage of "0" level, which corresponds to a change in the test path 32. The predetermined voltage of "0" level is optimal for the predetermined reference voltage.

This tuning is preferably done for each GDDR3 device independently, but can be done more finely if needed. For example, one could use independent tuning on a lower half versus an upper half on an interface, or if desired each data bin on an interface could be adjusted by itself. To accommodate running partial devices or individual data bits, a unique register for each partial structure is need to independently control the termination, but no additional external parts are needed.

The 0.4 VDD value may comprise the desired level and is to be used by all elements on the controller 13 side of the interface 40.

Figure 4:
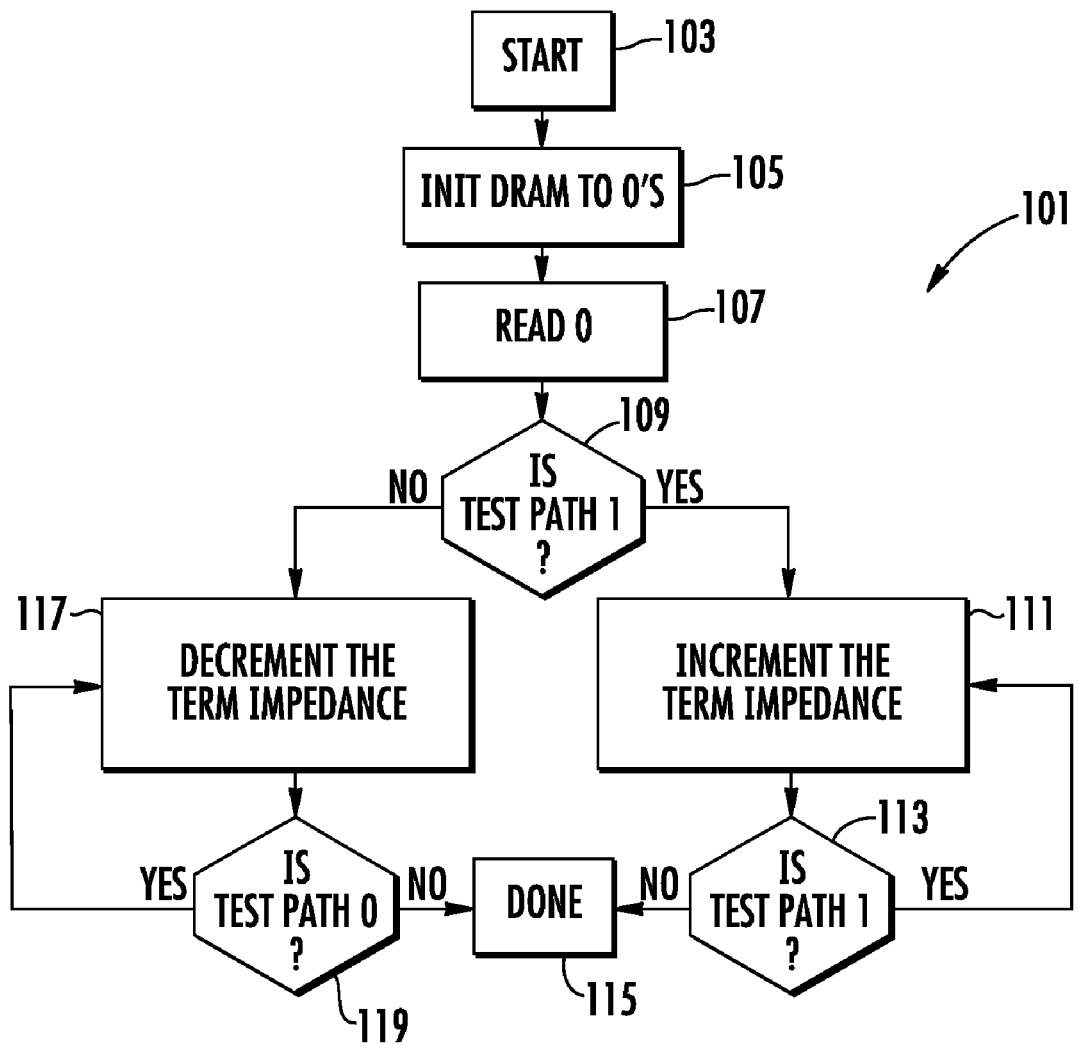
FIG. 4 is a flow diagram illustrating an operation during the matching of the memory controller and the memory device of FIG. 2.

FIG. 4 illustrates in a flow diagram 101 implementation of the method of the invention of the embodiment of FIG. 2. The exemplary method starts at step 103 and the DRAM 15 is initiated at step 105 to drive a "0" level on the data net 40. The controller 13 reads at step 107 a "0" level. Detector 33 determines at step 109 if the test path 32 is at "1" level. If so, the termination impedance is incremented at step 111 and the test path is again tested at step 113 until it changes, so that it is no longer a level "1". The process ends at step 115. If the test path is not a "1," the termination impedance is decremented at step 117 and the test path is again tested at step 119. The process continues until the test path changes, and the process concludes at step 115.

Figure 3:
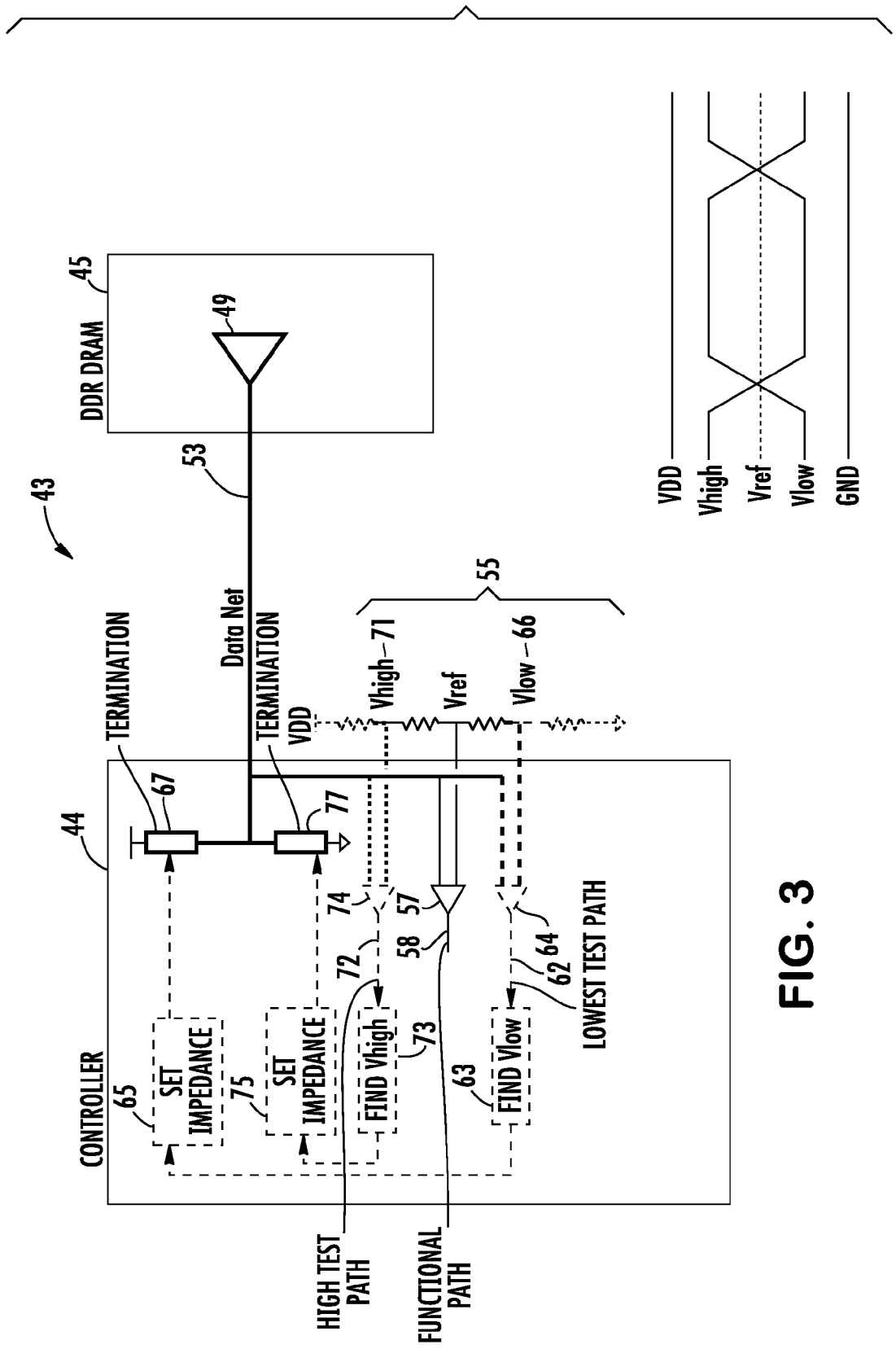
FIG. 3 is a second embodiment illustrating a connection between a memory device and a memory controller for coupling the memory device and memory controller during memory device driver training to reduce mismatches.

FIG. 3 illustrates an alternative embodiment of the invention in which two values are set on the data net 40. More particularly, the system 43 of FIG. 3, includes a DDR DRAM 45 which includes a driver 49. The controller 44 includes an arrangement of resistors 55 that provide a voltage through a comparator 57 connected on a functional path 58. Connections 66 and 71 provide a high voltage Vhigh and low voltage Vlow to two different test paths.

A Vhigh test path 72 includes a comparator 74, detector 73 and impedance module 75 connected to a termination device 77. Similarly, a Vlow test path 62 includes a comparator 64 and detector 63 connecting to an impedance module 65 which connects to a termination device 67.

In accordance with this embodiment of the invention, the DRAM 45 initially drives a "0" level voltage on the data net 53 that is read by the controller 44. The controller 44 operates as in the case of FIG. 2 through the Vlow connections to set a desired Vlow level as the "0" level. This level may be used to set the impedance at the termination device 67.

Similarly, the DRAM 45, during training, will then also drive a "1" level voltage on the data net 53. The test path 72 through comparator 74 voltage is adjusted to find a predetermined Vhigh voltage with detector 73, at which time the impedance is set by impedance module 75 at termination device 77 based on the Vhigh adjusted voltage.

Figure 5:
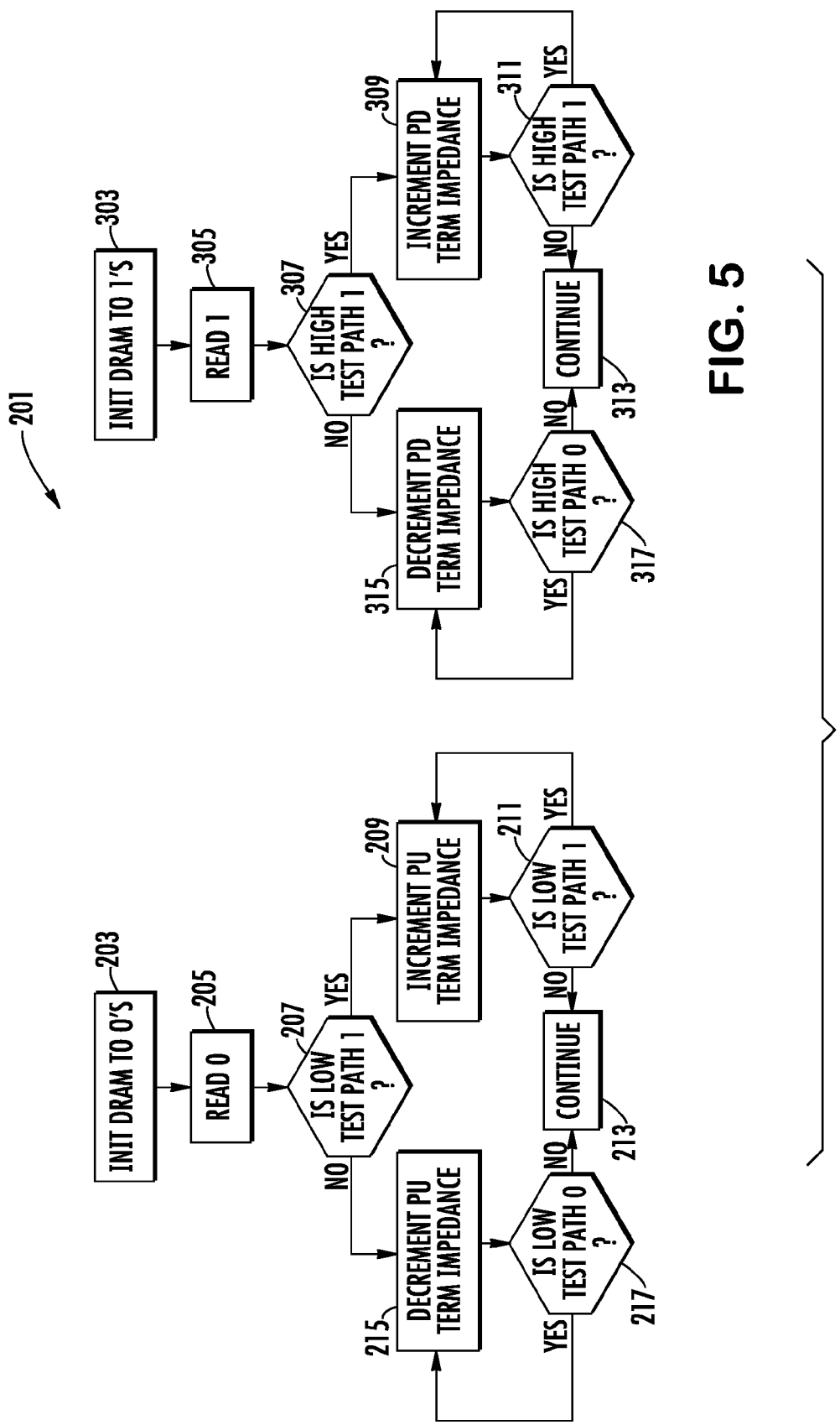
FIG. 5 is a flow diagram illustrating an operation during matching of the memory controller and memory device of FIG. 3.

FIG. 5 illustrates in flow chart 201 having steps executable by the embodiment of FIG. 3. On the Vlow side, the data net 53 is initialized at step 203 to a "0" level voltage. The controller 44 reads at step 205 a "0" level voltage. At step 207, it is determined if the low test path is at a level "1." If so, the pull up termination impedance is incremented at step 209. The test path is again tested at step 211. If the test path still is set at a level "1," the pull up termination impedance is again incremented at step 209 until a change in voltage occurs, at which time the process on the Vlow test path ends at step 213.

On the left side, if the test path is not a "1," the pull up termination impedance is decremented at step 215 and again tested at step 217. This process continues until the test path is no longer a "0" and the process terminates.

As shown in FIG. 5 on the right side, a similar process is applied to the "1" level on the data net 53. More particularly, relative to the Vhigh, the DRAM 45 is initiated to drive a level "1" voltage on the data net 53 at step 303. The controller 44 reads at step 305 a level "1" voltage on the net. The voltage on test path 72 is detected at step 307 to determine if it is at a level "1." If the voltage is at a level "1," the pull down termination impedance is incremented at step 309, and again tested at step 311. This continues until the test path level is no longer a "1", at which point the process terminates at step 313. A similar process occurs on the left side with steps 315 and 317 when the test path is not a level "1" on an initial read.

In the embodiment of FIG. 5, both the low and high levels require adjustment as with a mid-point Vref structure where active termination prevents driving low and high levels to full rail values. A unique register for each device sending data to a controller is appropriate and multiplexing of register values to adjust termination when switching from device to device that time share the same data is also required. Finer granularity than an entire device is possible in this embodiment. Additional pins beyond the accurate Vlow and Vhigh inputs to the controller are not required in any implementation.

Figure 6:
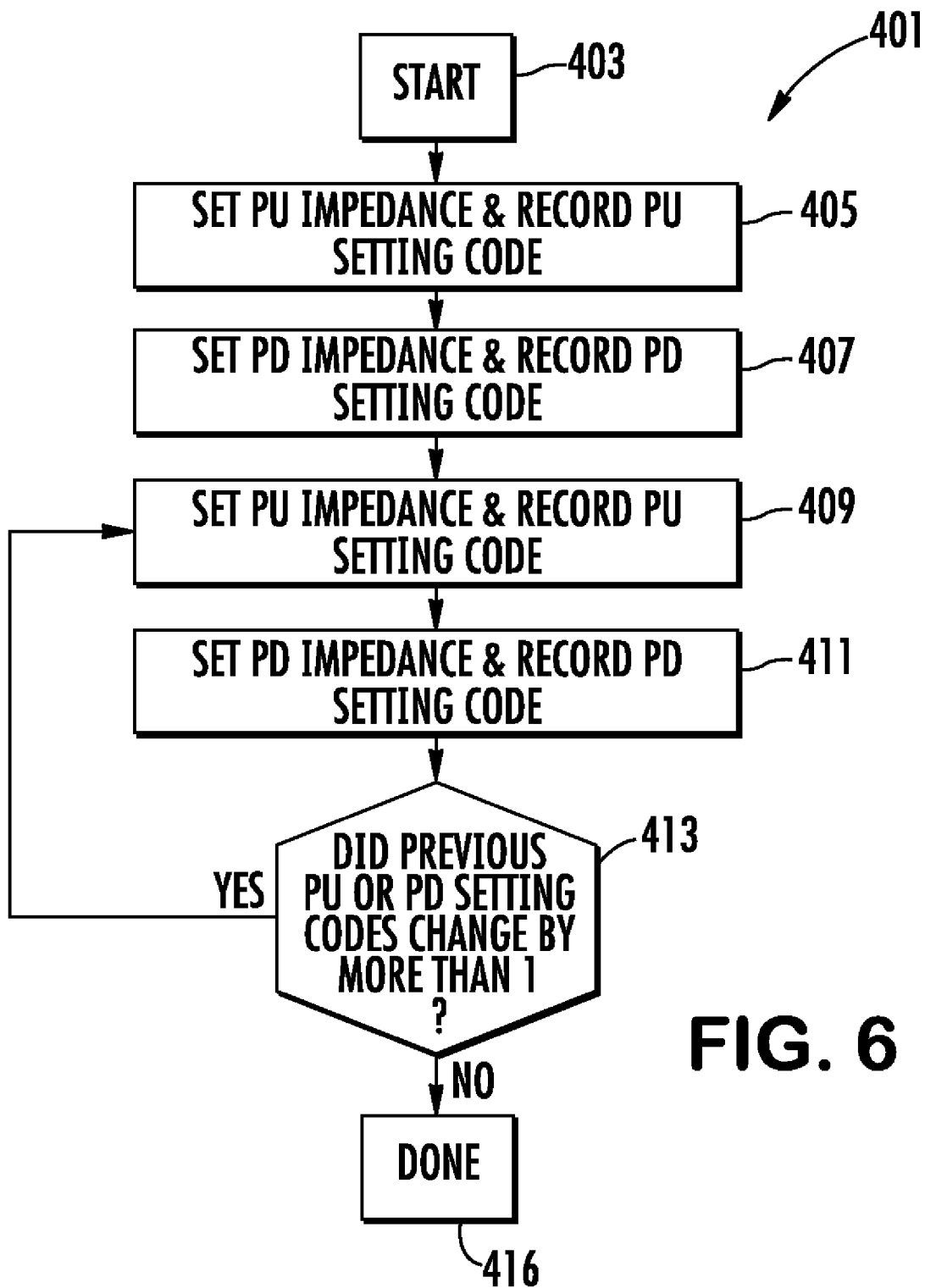
FIG. 6 is a flow diagram illustrating additional steps required during matching of the memory controller and memory device of FIG. 3.

In implementing the embodiment of FIG. 3, while the process as illustrated in FIG. 5 shows independently the setting of the Vlow and Vhigh, FIG. 6 illustrates that it is an iterative process because by changing the pull up impedance once Vlow is set, this also affects the pull down impedance and the setting of Vhigh. Thus, the flow chart 401 of FIG. 6 illustrates that while the pull up and pull down impedances may be set, readjustments may need to be done until the desired pull up and pull down impedances are found.

The process begins at step 403. The pull up impedance and its setting code are set and recorded at step 405. The pull down impedance and setting code are also set and recorded at step 407. A further iteration requires resetting and recording the pull up impedance at step 409 a second time and the pull down impedance is also set and recorded at step 411. At that point a determination is made at step 413 about whether the pull up and pull down impedance setting codes changed by more than 1 setting. If yes, the process returns and both the pull down and pull up impedance settings are reset and recorded at steps 409 and 411. A further determination is made at step 413 about whether the setting codes changed by more than one setting. If yes, the process is repeated. If not, the process ends at step 415.

As may be appreciated in this embodiment, other application variables may play a role in the optimal training of the interface relative to the appropriate high, low and Vref values or termination strengths that determine the levels. More specifically, termination impenence may vary with temperature and/or voltage level variations associated with activity on other system or sub-systems resources. Calibration from any of these methods may either be repeated as conditions change for maintenance of optimal settings and performance, or unique settings can be saved for different conditions if desired.

In an exemplary implementation, a temperature change of greater than 20 degrees centigrade, or some other value, from the original or last calibration could initiate a new calibration or loading of an alternate set of previously stored calibration values associated with the new temperature. This also could be implemented with variations associated with the activation or deactivation of other system resources such as turning on and off of another bus, interface, controller, or processor that in some way impacts the performance of the interface described herein. Recalibration in such an instance could be initiated or alternate settings could be used associated with the performance of the interface under such conditions. Further, circuits that monitor the voltage being used on an interface could also invoke an adjustment using previously stored values or initiate new training events to obtain maximum margins.

While the invention has been described with reference to a GDDR3 device and memory controller sub-system, one of ordinary skill in the art could also easily apply these techniques to other interfaces without departing from the concept disclosed and implemented in accordance with the embodiments described herein.

While the present invention has been illustrated by a description of various embodiments and while these embodiments have been described in considerable detail, it is not the intention of the Applicant's to restrict or in anyway limit to scope of appended claims to such detail. The invention in its broader aspects is therefore not limited to the specific details, representative apparatus and method, an illustrative example shown and described. Accordingly, departures may be made from such details without departing from the spirit or scope of Applicant's general inventive concept.

What is claimed is:

1. A method of setting a memory controller's termination impedance in an electrical communication bus having a memory controller connected to a memory device, comprising:
    connecting a memory device in an electrical communication bus with a corresponding memory controller during training of a drive impedance of a driver of the memory device;
    initiating a first voltage on the communication bus as a bit level "0" to be read by the memory controller;
    setting a first voltage on a first test path of the memory controller at the first voltage on the electrical communication bus;
    adjusting and monitoring the first voltage on the first test path; and
    when the voltage on the first test path switches its value, setting the impedance at the first termination device based on said switched first voltage.

2. The method of claim 1, wherein the switched first voltage on the test path is set at the "0" level voltage on the bus.

3. The method of claim 1, wherein said memory device is a GDDR3 memory device.

4. The method of claim 1, wherein a reference voltage for a functional path of the memory controller is set at 0.7 VDD and the "0" level voltage on the test path of the memory controller is set at 0.4 VDD, as the switched first voltage.

5. The method of claim 1 further comprising:
    setting a first reference voltage value at a reference resistor arrangement connected to the memory controller at a functional path;
    setting a first initialized voltage from the electrical communication bus at the test path of the memory controller;
    changing the voltage at the test path until it changes;
    setting the impedance of the termination device based on said changed voltage; and
    setting the "0" level to correspond to the changed voltage.

6. The method of claim 1, wherein said test path is monitored to detect when said voltage switches said value to a level of 0.4 VDD, and further comprising setting the termination impedance at the termination device based on said voltage level of 0.4 VDD.

7. The method of claim 1 further comprising:
    initializing a second voltage on the communication bus as a bit level "1" to be read by the memory controller;
    setting a second voltage on the electrical communication bus as a bit level "1" to be read by the memory controller;
    setting a second voltage on a second test path of the memory controller at the second voltage on the electrical communication bus;
    changing and monitoring the second voltage on the second test path; and
    when the voltage on the second test path switches its value, setting the impedance at the second termination device based on said switched second voltage.

8. The method of claim 7, wherein said switched first voltage is a first predetermined value.

9. The method of claim 7, wherein said switched first voltage is a first predetermined value and said switched second voltage is a second predetermined value.

10. The method of claim 9, wherein said method is repeated iteratively for said switched first voltage and said switched second voltage until both said switched first voltage and switched second voltage are at said predetermined values.

11. A coupled memory controller and memory device in an electrical communication bus, comprising:
    a connection between a memory interface of the memory controller to the memory device, wherein the memory controller is programmed to read a first voltage level initialized as a first bit level voltage from the connection from the memory device;
    a first test path connected to the connection between the memory controller and the memory device to have the first voltage level applied thereto, said first test path programmed for adjusting said first voltage level, and said first test path connected to a first termination device of said memory controller;
    a first detector for detecting a first predetermined switched voltage on the first test path; and
    a first impedance module for setting the impedance of the first termination device based on said first predetermined switched voltage.

12. The device of claim 11, wherein said first detector is programmed for detecting said first predetermined switched voltage as 0.4 VDD.

13. The device of claim 11, further comprising said controller being programmed for setting the initialized first bit level voltage on the connection between memory controller and the memory device at said first switched predetermined level.

14. The device of claim 13, wherein said first switched voltage predetermined level is 0.4 VDD.

15. The device of claim 11, wherein said memory device is a GDDR3 DRAM, and said connection between said memory controller and memory device is an electrical communication bus.

16. A coupled memory controller and memory device is an electrical communication bus, comprising:
    a connection between a memory interface of the memory controller to the memory device, wherein the memory controller is programmed to read a first voltage level initialized as a first bit level voltage and a second voltage level initialized as a second bit level voltage on the connection from the memory device;
    a first test path connected to the connection between the memory controller and the memory device to have the first voltage level applied thereto, wherein said first test path is programmed for adjusting said first voltage level and is connected to a first termination device of said memory controller;
    a first detector for detecting a first predetermined switched voltage on the first test path;
    a first impedance module for setting the impedance of the first termination device based on said first predetermined switched voltage;
    a second test path connected to the connection between the memory controller and the memory device to have the second voltage level applied thereto, said second test path programmed for adjusting said second voltage level, and wherein said second test path is connected to a second termination device of said memory controller;
    a second detector for detecting a second predetermined switched voltage on the second test path; and a second impedance module for setting the impedance of the second termination device based on said second predetermined switched voltage.

17. The device of claim 16, wherein said first detector is programmed for setting the impedance of the first termination device based on said first predetermined switched voltage and for setting said first predetermined switched voltage as said first bit level voltage on the bus.

18. The device of claim 16, wherein said second detector is programmed for setting the impedance of the second termination device based on said second predetermined switched voltage and for setting said second predetermined switched voltage as said second bit level voltage on the bus.

19. The device of claim 16, wherein memory device is a DDR SDRAM.

20. The device of claim 16, wherein said first bit for said first voltage is a "0" and said second bit for said second voltage is a "1".

* * * * *